US012347911B2

(12) United States Patent
Yang et al.

(10) Patent No.: US 12,347,911 B2
(45) Date of Patent: Jul. 1, 2025

(54) FILTER WITH ADHESIVELY BONDED FILTER PATTERNS AND MANUFACTURING METHOD THEREOF

(71) Applicant: National Tsing Hua University, Hsinchu (TW)

(72) Inventors: Shang-Hua Yang, Hsinchu (TW); Yi-Chun Hung, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 227 days.

(21) Appl. No.: 18/082,579

(22) Filed: Dec. 16, 2022

(65) Prior Publication Data

US 2023/0378623 A1 Nov. 23, 2023

(30) Foreign Application Priority Data

May 19, 2022 (TW) ................................ 111118691

(51) Int. Cl.
*H01P 1/203* (2006.01)
*H01P 1/20* (2006.01)
*H01P 11/00* (2006.01)

(52) U.S. Cl.
CPC ................ *H01P 1/203* (2013.01); *H01P 1/20* (2013.01); *H01P 11/003* (2013.01); *H01P 11/007* (2013.01)

(58) Field of Classification Search
CPC ............................... H01P 1/203; H01P 11/007
USPC .......................................................... 333/204
See application file for complete search history.

(56) References Cited

U.S. PATENT DOCUMENTS

| | | | |
|---|---|---|---|
| 5,832,578 A | 11/1998 | Yuda et al. | |
| 6,461,527 B1 * | 10/2002 | Haupt et al. | H05K 3/0035 430/311 |
| 7,497,960 B2 | 3/2009 | Sugahara | |
| 10,667,394 B1 * | 5/2020 | Ciaccio | H01P 11/00 |
| 2005/0009226 A1 | 1/2005 | Kumagai et al. | |
| 2006/0250308 A1 * | 11/2006 | Pinel et al. | H01Q 21/0006 333/204 |
| 2009/0029127 A1 | 1/2009 | Watanabe et al. | |

(Continued)

FOREIGN PATENT DOCUMENTS

| | | |
|---|---|---|
| CN | 105048028 | 11/2015 |
| CN | 107768067 | 6/2020 |

(Continued)

OTHER PUBLICATIONS

"Notice of allowance of Taiwan Counterpart Application", issued on May 8, 2023, p. 1-p. 6.

*Primary Examiner* — Benny T Lee
(74) *Attorney, Agent, or Firm* — JCIPRNET

(57) ABSTRACT

A manufacturing method of a filter, including the following steps: defining an adhesive layer on a surface of a substrate according to a filter pattern; covering the surface of the substrate by a conductive layer, wherein the conductive layer comprises a first covering part and a second covering part, wherein the first covering part and the second covering part are non-overlapping. In an aspect, the first covering part of the conductive layer is attached to the adhesive layer according to the filter pattern and the second covering part is not attached to the adhesive layer. In an aspect, the second covering part of the conductive layer is attached to the surface of the substrate to form the filter pattern.

16 Claims, 11 Drawing Sheets

(56) References Cited

U.S. PATENT DOCUMENTS

| | | | |
|---|---|---|---|
| 2010/0142035 A1 | 6/2010 | Yeo | |
| 2015/0339001 A1 | 11/2015 | Zirkl et al. | |

FOREIGN PATENT DOCUMENTS

| | | |
|---|---|---|
| TW | 461178 | 10/2001 |
| TW | 200731664 | 8/2007 |
| TW | 201919336 | 5/2019 |
| TW | 202013889 | 4/2020 |
| TW | 202023812 | 7/2020 |
| TW | 202105646 | 2/2021 |
| TW | 202147550 | 12/2021 |
| WO | 2020212922 | 10/2020 |
| WO | 2022060957 | 3/2022 |

* cited by examiner

FILTER WITH ADHESIVELY BONDED FILTER PATTERNS AND MANUFACTURING METHOD THEREOF

CROSS-REFERENCE TO RELATED APPLICATION

This application claims the priority benefit of Taiwanese application no. 111118691, filed on May 19, 2022. The entirety of the above-mentioned patent application is hereby incorporated by reference herein and made a part of this specification.

BACKGROUND

Technical Field

The disclosure relates to a filter technology applicable to wireless communication, electromagnetic waves, non-contact sensing, remote sensing, imaging or remote telemetry. In particular, the disclosure relates to a filter and a manufacturing method thereof.

Description of Related Art

A filter plays an important role in communication technology and non-destructive precision testing, such as biomedical measurement, non-destructive testing, sixth-generation wireless communication, and the Internet of Things among other application scenarios. These application scenarios typically require use of a terahertz frequency band, a sub-terahertz frequency band, or a mmWave frequency band. Therefore, more and more attention has been paid to development of a terahertz filter, a sub-terahertz filter, or a mmWave filter in recent years.

Conventional implementation of terahertz filter, sub-terahertz filter, or mmWave filter typically requires precision manufacturing through microelectronics manufacturing equipments, high-precision prototyping machines, or high-energy laser precision cutting machines. In the conventional implementation, the environment setup of filter manufacturing equipment requires a high cost for providing mass production. The manufacturing of a filter by, for example, a high-energy laser engraving machine, a micro-imprinting machine, and laser sintering metal equipment, also involves a high price of the equipment and difficulty in mass production.

The high cost of conventional implementations of filter manufacturing equipment and filter manufacturing method leads to difficulty in rapid development and manufacturing of a filter, and obstructs development and relevant commercial applications of the terahertz filter, the sub-terahertz filter, or the mmWave filter in industrial and consumer product applications.

SUMMARY OF THE INVENTION

The disclosure provides a filter and a manufacturing method thereof, which reduces cost of developing and manufacturing the filter.

According to an embodiment of the disclosure, a filter includes a substrate and a filter structure. The filter structure forms a filter pattern on a surface of the substrate. The filter structure includes: an adhesive layer coupled to the substrate; and a conductive layer, coupled to the adhesive layer, including a first covering part and a second covering part. The first covering part and the second covering part are non-overlapping. The first covering part of the conductive layer is attached to the adhesive layer and the second covering part of the conductive layer is not attached to the adhesive layer.

According to an embodiment of the disclosure, a filter includes a substrate and a filter structure the filter structure forms a filter pattern on a surface of the substrate. The filter structure includes: a conductive layer, coupled to the substrate, including a first covering part and a second covering part. The first covering part and the second covering part are non-overlapping. The second covering part of the conductive layer is attached to the surface of the substrate to form the filter pattern.

According to an embodiment of the disclosure, a manufacturing method of a filter includes the following steps: defining an adhesive layer on a surface of a substrate according to a filter pattern; covering the surface of the substrate by a conductive layer, wherein the conductive layer comprises a first covering part and a second covering part, wherein the first covering part and the second covering part are non-overlapping, wherein the first covering part of the conductive layer is attached to the adhesive layer according to the filter pattern and the second covering part is not attached to the adhesive layer.

Based on the foregoing, in the filter and the manufacturing method thereof according to the embodiments of the disclosure, the manufacturing method according to the embodiments of the disclosure overcomes the high cost of conventional implementations of filter manufacturing equipment such that mass production can be achieved with reduced cost. The manufacturing method according to the embodiments of the disclosure is applicable to printing devices which are commonly affordable at consumer-level prices, for example, a home printer which may cost at a comparable price to that of common household appliances, and therefore the overall cost of the equipment and environment setup can be greatly reduced in comparison with the conventional manufacturing methods of a terahertz filter, sub-terahertz filter or mmWave filter. The manufacturing method according to the embodiments of the disclosure achieves mass production, minimum cost of consumables, and insusceptibility to the production environment, contributing to rapid development and manufacturing of a terahertz filter, sub-terahertz filter, or mmWave filter. In this way, the development of industrial applications in the terahertz filter, sub-terahertz filter or mmWave filter can be improved by rapid prototyping and low-cost mass production.

To make the aforementioned filter and manufacturing method more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENTS

Figure 1A:
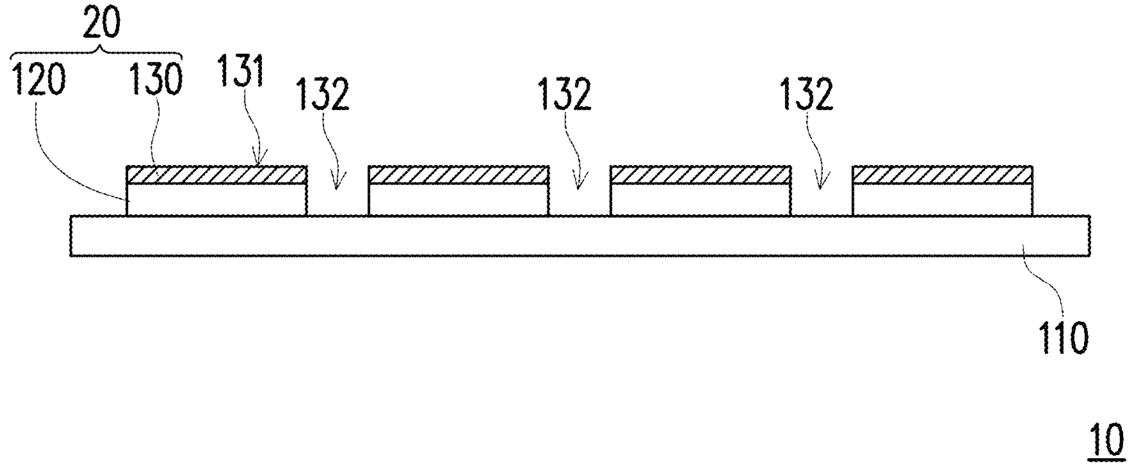
FIG. 1A is a schematic diagram of a filter according to an embodiment of the disclosure.

Some embodiments of the disclosure accompanied with the drawings will be described in detail below. For the reference numerals used in the following description, the same reference numerals shown in the detail description of the different drawings will be regarded as the same or similar elements. These embodiments are only a part of the disclosure and do not disclose all possible implementations of the disclosure. To be more precise, these embodiments are only examples of a filter and a manufacturing method within the scope of the claims of the disclosure. Wherever possible, elements/components/steps using the same reference numerals in the drawings and embodiments denote the same or similar parts. Cross-reference may be made between relevant descriptions of elements/components/steps using the same reference numerals or using the same terms in different embodiments.

FIG. 1A is a schematic diagram of a filter according to an embodiment of the disclosure. With reference to FIG. 1A, a filter 10 includes a substrate 110 and a filter structure 20. The filter structure 20 includes an adhesive layer 120 and a conductive layer 130. The adhesive layer 120 is coupled to the substrate 110. The conductive layer 130 is coupled to the adhesive layer 120. The filter structure 20 forms a filter pattern on a surface of the substrate 110. When electromagnetic waves pass through the filter 10, the passing electromagnetic waves are filtered by the conductive layer 130 of the filter structure 20 which forms the filter pattern. The filter pattern may be designed according to the required filtering frequency band of the application scenarios, which is also referred to as a target frequency band. The filter 10 may be a terahertz (THz) filter, a sub-terahertz filter, or a mmWave filter, for example. Specifically, the filter 10 may operate at a terahertz (THz), sub-terahertz, or mmWave frequency band.

In the filter structure 20, the adhesive layer 120 is attached on the surface of the substrate 110 according to the filter pattern. Specifically, the adhesive layer 120 may present the same pattern as the filter pattern on the surface of the substrate 110. Moreover, the conductive layer 130 is attached on the adhesive layer 120 to form the filter pattern. In an embodiment, an adhesive force or viscosity exist between the adhesive layer 120 and the conductive layer 130 to attach the conductive layer 130 on the adhesive layer 120 to form the filter pattern. For example, after the adhesive layer 120 and the conductive layer 130 covering the adhesive layer 120 are heated, adhesive force is generated between the adhesive layer 120 and the conductive layer 130 to attach the conductive layer 130 on the adhesive layer 120 according to the filter pattern. In some embodiments, adhesive force may be generated between the adhesive layer 120 and the conductive layer 130 by exerting pressure on the conductive layer 130 covering the adhesive layer 120, and thus heating may be optional. In one preferred embodiment, heating and exerting pressure may be adopted in combination to increase the yield rate of manufactured filters of satisfactory quality. The conductive layer 130 as defined according to the filter pattern achieves filtering on the passing electromagnetic waves.

In one embodiment, the conductive layer 130 includes a first covering part 131 and a second covering part 132. The first covering part 131 and the second covering part 132 are non-overlapping. The first covering part 131 of the conductive layer 130 is attached to the adhesive layer 120 and the second covering part 132 of the conductive layer 130 is not attached to the adhesive layer 120.

In some alternative embodiments of the disclosure, it is worth noting that the adhesive layer 120 of the filter may be optional for forming the filter pattern of the filter structure. In one embodiment, a filter includes a substrate 110 and a filter structure. The filter structure forms a filter pattern on a surface of the substrate 110. In an alternative embodiment, the filter structure only includes a conductive layer 130, coupled to the substrate 110, including a first covering part 131 and a second covering part 132. The first covering part 131 and the second covering part 132 are non-overlapping. The second covering part 132 of the conductive layer 130 is attached to the surface of the substrate 110 to form the filter pattern.

Figure 1B:
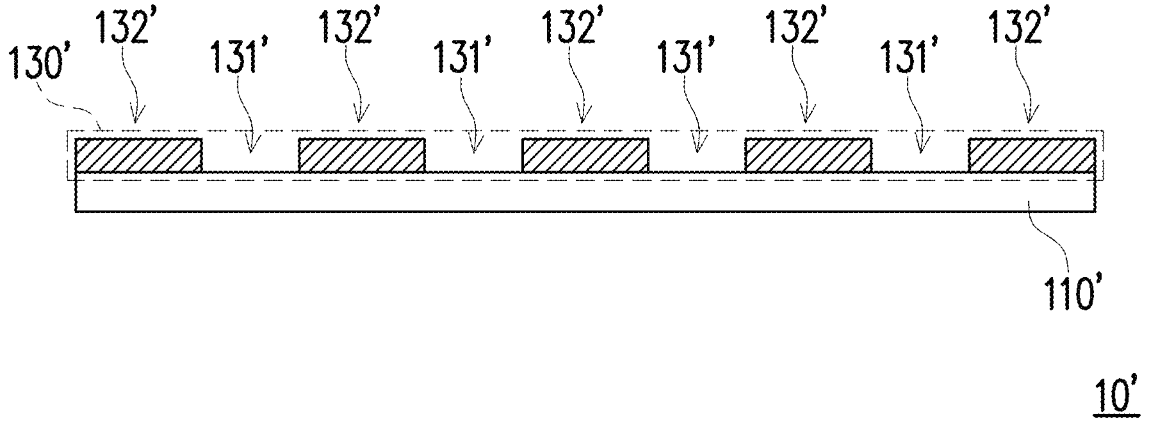
FIG. 1B is a schematic diagram of a filter according to an embodiment of the disclosure.

FIG. 1B is a schematic diagram of a filter according to an embodiment of the disclosure. In one embodiment, a filter 10' includes a substrate 110' and a filter structure. The filter structure forms a filter pattern on a surface of the substrate 110'. The filter structure includes a conductive layer 130'.

The conductive layer 130' is coupled to the substrate 110'. The conductive layer 130' includes a third covering part 131' and a fourth covering part 132'. The third covering part 131' and the fourth covering part 132' are non-overlapping. The fourth covering part 132' of the conductive layer 130' is attached to the surface of the substrate 130' to form the filter pattern.

In one embodiment, the third covering part 131' and the fourth covering part 132' as shown in FIG. 1B form complementary filter patterns corresponding to the first covering part 131 and the second covering part 132 as shown in FIG. 1A.

Figure 2A:
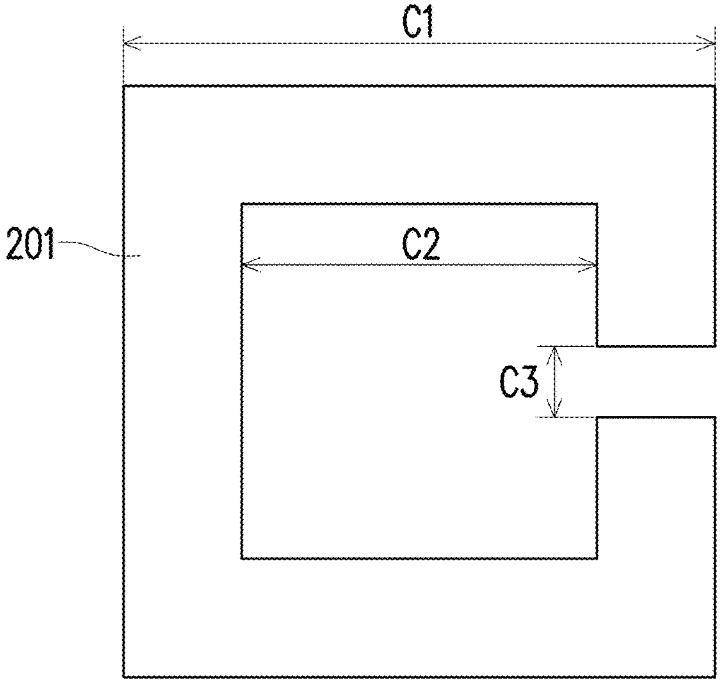
FIG. 2A is a schematic diagram of a filter pattern presenting a C-shaped pattern according to an embodiment of the disclosure.

FIG. 2A is a schematic diagram of a filter pattern presenting a C-shaped pattern according to an embodiment of the disclosure. As shown in FIG. 2A, a filter pattern 201 presents a C-shaped pattern. The filter pattern 201 includes a first side length C1, a second side length C2, and a gap C3. The shape of the filter pattern 201 may be determined by dimensions of the first side length C1, the second side length C2, and the gap C3. Specifically, the first side length C1 determines a first square area, the second side length C2 determines a second square area, and the first side length C1 is greater than the second side length C2. The gap C3 determines the opening size of the C-shaped pattern.

Figure 5A:
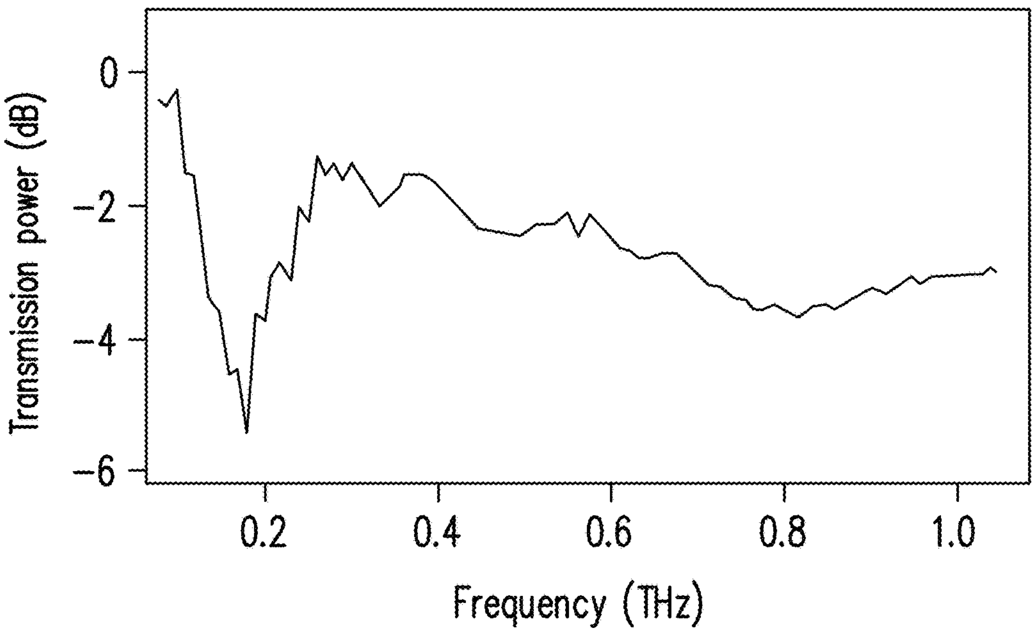
FIG. 5A is a transmission power spectrum of a filter according to an embodiment of the disclosure.

For example, in an embodiment of the disclosure, the filter pattern 201 presenting a C-shaped pattern has dimensions as follows: the first side length C1=0.4 millimeter (mm), the second side length C2=0.2 mm, and the gap C3=0.05 mm. In other words, the C-shaped pattern of the filter pattern 201 may be defined by a square having a side length of 0.4 mm, a square having a side length of 0.2 mm, and an opening of 0.05 mm. In an embodiment, the filter pattern 201 presenting a C-shaped pattern shown in FIG. 2A effectively reflects electromagnetic waves at a frequency band of 0.2 THz and allow electromagnetic waves at other terahertz frequency bands to pass through, thereby achieving filtering. The transmission power spectrum according to this embodiment is shown in FIG. 5A.

The pattern of the filter pattern 201 may be designed according to the required filter frequency band, or referred to as the target frequency band. The filter pattern 201 may not be limited to a C-shaped pattern. For example, the filter pattern 201 may be a C-shaped pattern, an H-shaped pattern, a cross-shaped pattern, a double L-shaped pattern, or a combination of the patterns above. In an embodiment, the filter pattern 201 may also be a different pattern from a C-shaped pattern, an H-shaped pattern, a cross-shaped pattern, and a double L-shaped pattern. In an embodiment, the shape and the dimensions of the filter pattern 201 may be designed according to the requirements of the application scenario. Specifically, in an embodiment, the dimensions of the first side length C1, the second side length C2, and the pitch C3 of the filter pattern 201 may be determined according to a target frequency band of the application scenario, so that the shape and the dimensions of the filter pattern 201 correspond to the target frequency band. In an embodiment, the target frequency band may be a terahertz frequency band, a sub-terahertz frequency band, or a mmWave frequency band. In some embodiments, the filter pattern 201 corresponds to a plurality of designed frequency bands which may include at least one of a terahertz frequency band, a sub-terahertz frequency band, or a mmWave frequency band.

Figure 2B:
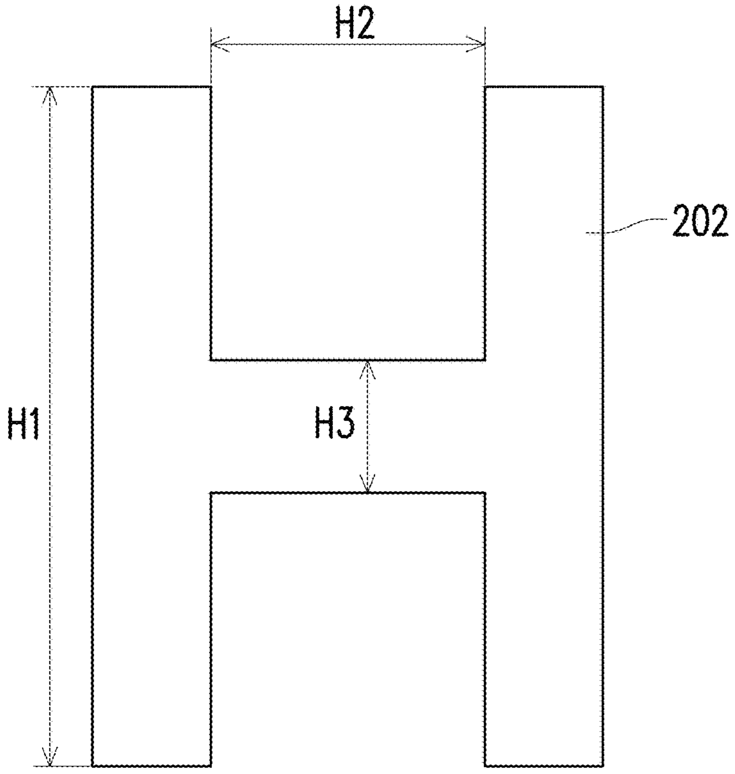
FIG. 2B is a schematic diagram of a filter pattern presenting an H-shaped pattern according to an embodiment of the disclosure.
Figure 5B:
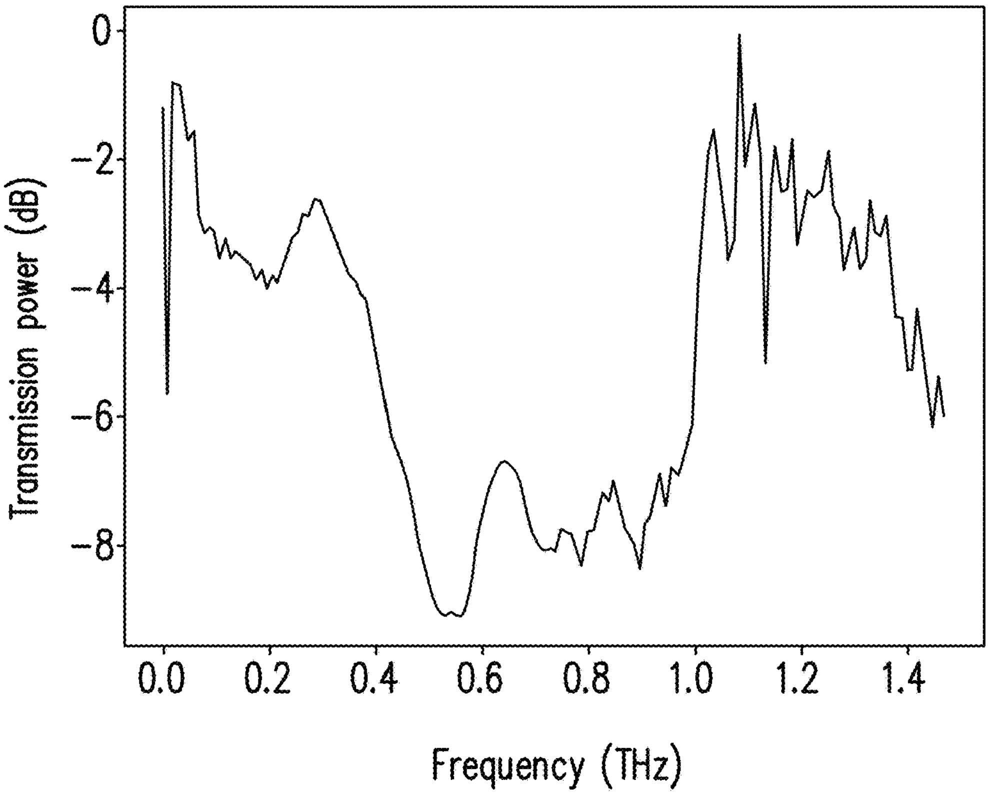
FIG. 5B is a transmission power spectrum of a filter according to an embodiment of the disclosure.

FIG. 2B is a schematic diagram of a filter pattern presenting an H-shaped pattern according to an embodiment of the disclosure. With reference to FIG. 2B, a filter pattern 202 presents an H-shaped pattern. The filter pattern 202 includes a height H1, an opening width H2, and a central height H3. The shape of the H-shaped pattern presented by the filter pattern 202 may be determined by dimensions of the height H1, the opening width H2, and the central height H3. In an embodiment, the shape and dimensions of the filter pattern 202 may be designed according to the requirements of a target frequency band of the application scenario, so that the dimensions of the height H1, the opening width H2, and the central height H3 of the filter pattern 202 correspond to the target frequency band. The transmission power spectrum according to this embodiment is shown in FIG. 5B. In an embodiment, the target frequency band may be a terahertz frequency band, a sub-terahertz frequency band, or a mmWave frequency band. In some embodiments, the filter pattern 202 corresponds to a plurality of designed frequency bands which may include at least one of a terahertz frequency band, a sub-terahertz frequency band, or a mmWave frequency band.

Figure 2C:
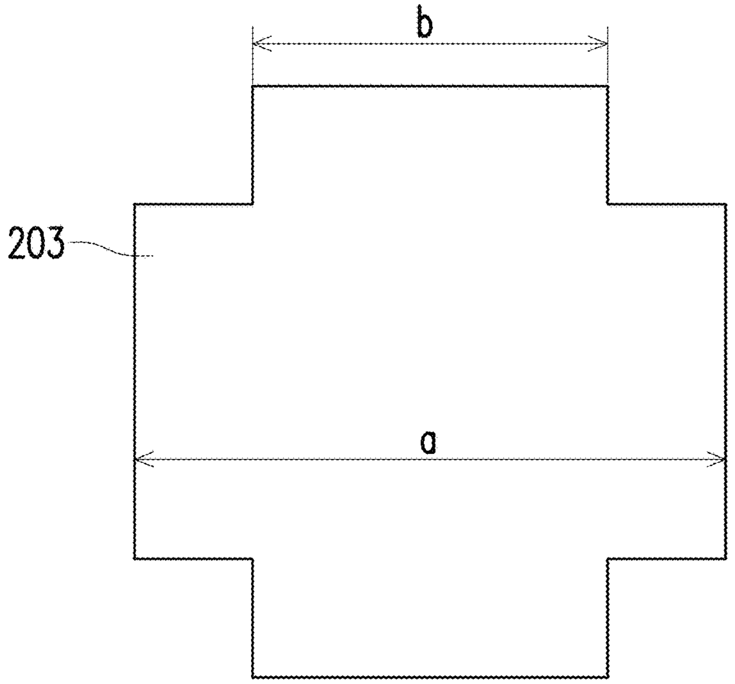
FIG. 2C is a schematic diagram of a filter pattern presenting a cross-shaped pattern according to an embodiment of the disclosure.

FIG. 2C is a schematic diagram of a filter pattern presenting a cross-shaped pattern according to an embodiment of the disclosure. With reference to FIG. 2C, a filter pattern 203 presents a cross-shaped pattern. The filter pattern 203 includes a length a and a width b. The shape of the cross-shaped pattern presented by the filter pattern 203 may be determined by dimensions of the length a and the width b. In an embodiment, dimensions of the filter pattern 203 may be designed according to the requirements of the application scenario. In an embodiment, the shape and the dimensions of the filter pattern 203 may be designed according to the requirements of a target frequency band of the application scenario, so that the length a and the width b of the filter pattern 203 correspond to the target frequency band. In an embodiment, the target frequency band may be a terahertz frequency band, a sub-terahertz frequency band, or a mmWave frequency band. In some embodiments, the filter pattern 203 corresponds to a plurality of designed frequency bands which may include at least one of a terahertz frequency band, a sub-terahertz frequency band, or a mmWave frequency band.

Figure 2D:
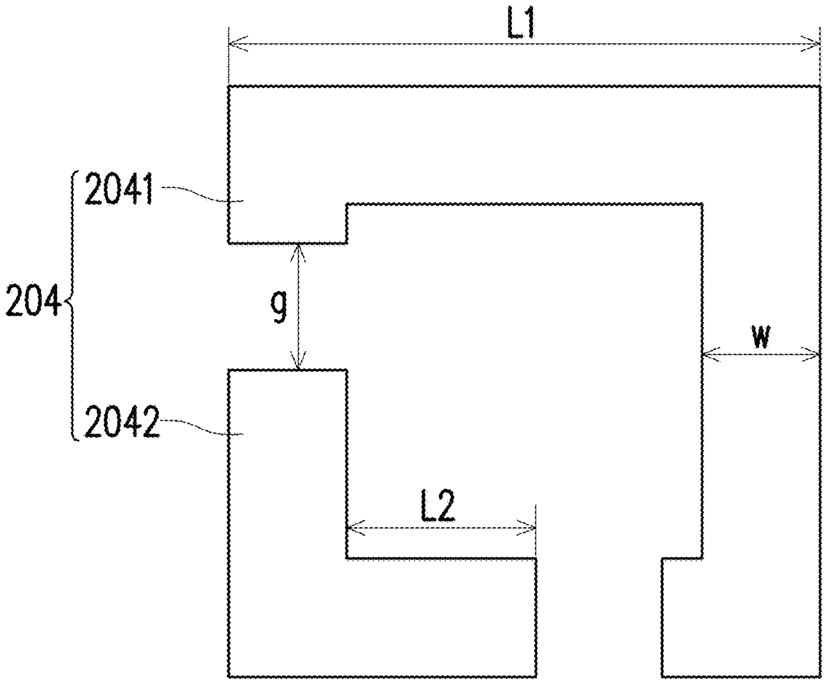
FIG. 2D is a schematic diagram of a filter pattern presenting a double L-shaped pattern according to an embodiment of the disclosure.

FIG. 2D is a schematic diagram of a filter pattern presenting a double L-shaped pattern according to an embodiment of the disclosure. With reference to FIG. 2D, a filter pattern 204 in FIG. 2D presents a double L-shaped pattern and includes a first L-shaped pattern 2041 and a second L-shaped pattern 2042. The first L-shaped pattern 2041 includes a first length L1 and a pattern width w. The second L-shaped pattern 2042 includes a second length L2. A gap g exists between the first L-shaped pattern 2041 and the second L-shaped pattern 2042. The shape of the double L-shaped pattern presented by the filter pattern 204 may be determined by dimensions of the first length L1, the pattern width w, the second length L2, and the gap g. In an embodiment, dimensions of the filter pattern 204 may be designed according to the requirements of the application scenario. In an embodiment, the shape and the dimensions of the filter pattern 204 may be designed according to the requirements of a target frequency band of the application scenario, so that the first length L1, the pattern width w, the second length L2, and the gap g of the filter pattern 204 correspond to the target frequency band. In an embodiment, the target frequency band may be a terahertz frequency band, a sub-terahertz frequency band, or a mmWave frequency band. In some embodiments, the filter pattern 204 corresponds to a plurality of designed frequency bands which may include at least one of a terahertz frequency band, a sub-terahertz frequency band, or a mmWave frequency band.

With reference back to FIG. 1A, in some embodiments, the filter 10 may adopt different materials for different application scenarios. Specifically, the substrate 110 may be a flexible material, such as paper, plastic, polymer, biocompatible material, or glass, and may also be an inflexible material. The substrate 110 may be a semiconductor substrate, such as a silicon substrate. The substrate 110 is not limited to a planar shape, and may also be a bent curved surface. The substrate 110 may include any material at a terahertz, sub-terahertz, or mmWave frequency band with high transmittance and low transmittance. Generally speaking, filtering is relatively effective when a material with high transmittance is used as the substrate, while filtering is relatively ineffective when a material with low transmittance or high attenuation is used as the substrate.

The adhesive layer 120 may include a thermal-transfer-printing material, such as toner, ink, pigment, and other heating adhesives, for example, a hot-melt adhesive and other similar organic heating-type adhesives. The adhesive layer 120 may be an adhesive material that generates viscosity or adhesive force when being in contact with other materials. Namely, viscosity or adhesive force may be generated between the adhesive layer 120 and the conductive layer 130 because of the material properties of the adhesive layer 120 and the conductive layer 130. In one embodiment, the adhesive layer 120 generates viscosity or an adhesive force when being heated, so that the conductive layer 130 is adhered to the adhesive layer 120 after being heated. In one embodiment, viscosity or adhesive force may be generated between the adhesive layer 120 and the conductive layer 130 by exerting pressure on the conductive layer 130 covering the adhesive layer 120, and thus heating may be optional. In one preferred embodiment, heating and exerting pressure may be adopted in combination to increase the yield rate of manufactured filters of satisfactory quality.

The conductive layer 130 may include a material that forms a thin film, and specifically a material that forms a thin film by thinning, electroplating, or any manufacturing process of film thinning. For example, the conductive layer 130 may include a metal material or other materials with good conductivity, such as metal foil, gold foil, gold, silver, copper, an alloy thereof, or a highly conductive polymer. Specifically, when the conductive layer 130 covers the adhesive layer 120, the conductive layer 130 may be adhered on the adhesive layer 120 after being heated. However, in this embodiment, if the conductive layer 130 covers the substrate 110, the conductive layer 130 may not be adhered to the substrate 110 after being heated. In other words, in this embodiment, the pattern of conductive layer 130 may not be defined by attaching the conductive layer 130 to the substrate 110 directly. Therefore, the adhesive layer 120 is defined on the substrate 110 according to the filter pattern 201, and then the conductive layer 130 is attached on the adhesive layer 120. Accordingly, the filter structure 20 of the filter 10 achieves filtering, with the conductive layer 130 defined according to the filter pattern 201, by the principle that metal or other materials with good conductivity reflect terahertz waves at designed frequency bands.

Figure 3A:
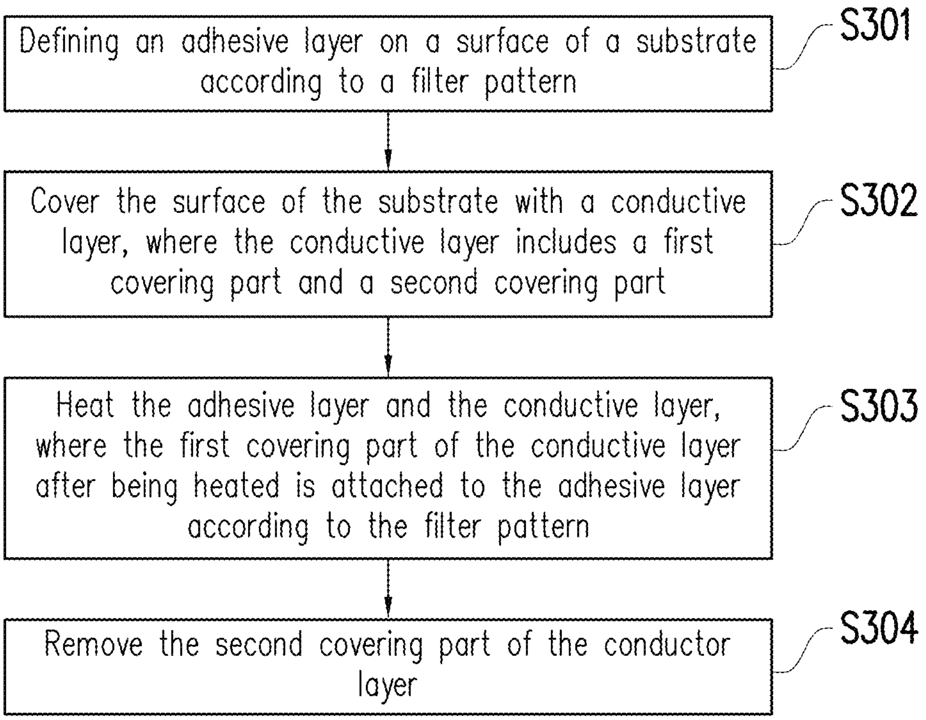
FIG. 3A is a flowchart of a manufacturing method of a filter according to an embodiment of the disclosure.
Figure 3B:
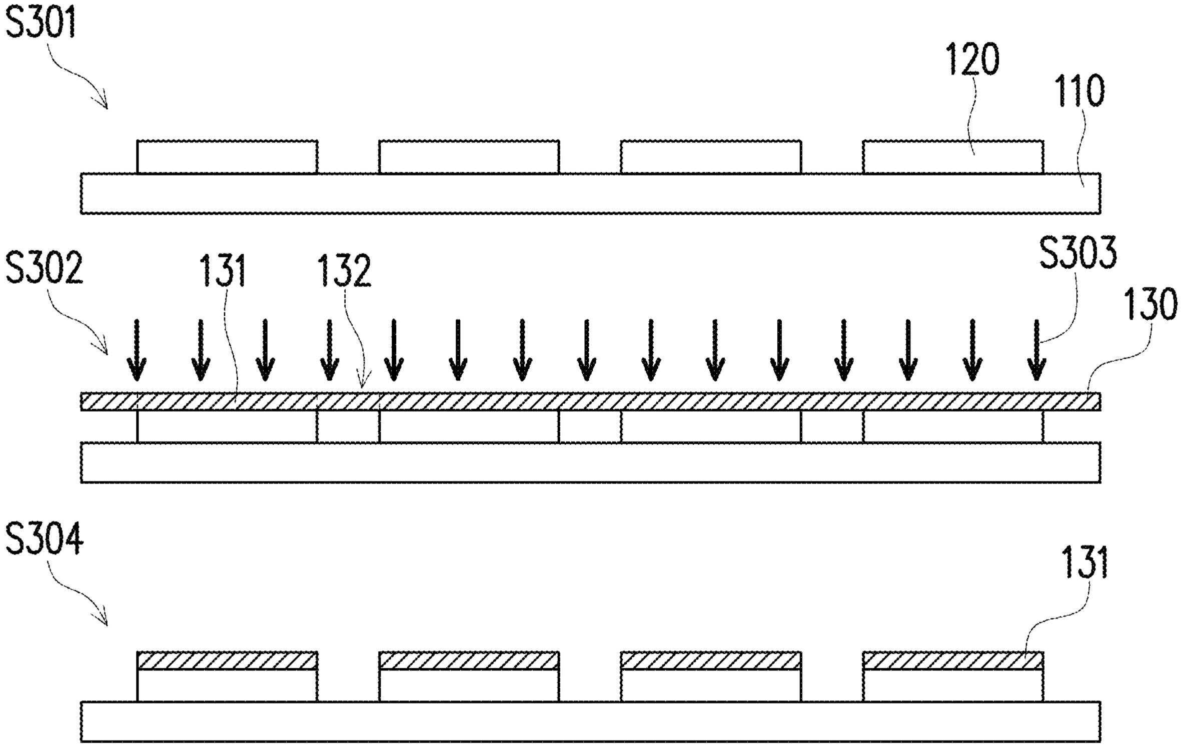
FIG. 3B is a schematic diagram of steps of manufacturing a filter according to an embodiment of the disclosure.

FIG. 3A is a flowchart of a manufacturing method of a filter according to an embodiment of the disclosure. The manufacturing method shown in FIG. 3A may be used to manufacture the filter 10 shown in FIG. 1A. FIG. 3B is a schematic diagram of steps of manufacturing a filter according to an embodiment of the disclosure. Reference may be made to the flowchart of FIG. 3A for the schematic diagram of steps shown in FIG. 3B.

With reference to FIG. 3A and FIG. 3B together, in step S301, the adhesive layer 120 is defined on a surface of the substrate 110 according to a filter pattern. In step S302, the surface of the substrate 110 is covered by the conductive layer 130. The conductive layer 130 includes a first covering part 131 and a second covering part 132. The first covering part 131 and the second covering part 132 are non-overlapping. The first covering part 131 of the conductive layer 130 is attached to the adhesive layer 120 and the second covering part 132 of the conductive layer 130 is not attached to the adhesive layer 120.

In step S303, the adhesive layer 120 and the conductive layer 130 are heated. The first covering part 131 of the conductive layer 130 after being heated is attached on the adhesive layer 120 according to the filter pattern. In step S304, the second covering part 132 of the conductive layer 130 is removed.

The first covering part 131 of the conductive layer 130 covers the adhesive layer 120. The first covering part 131 of the conductive layer 130 is adhered and attached on the adhesive layer 120 after the conductive layer 130 is heated. Comparatively, the second covering part 132 of the conductive layer 130 covers the substrate 110. In other words, in this embodiment, the second covering part 132 of the conductive layer 130 is not in contact with the adhesive layer 120. Therefore, in this embodiment, the second covering part 132 of the conductive layer 130 is not adhered on the adhesive layer 120 after the conductive layer 130 is heated. Moreover, due to the material of the conductive layer 130, in this embodiment, the second covering part 132 of the conductive layer 130 is not likely to be attached on the substrate 110.

Concretely, in one embodiment, since the second covering part 132 is not adhered on the adhesive layer 120, the second covering part 132 of the conductive layer 130 can be removed directly (for example, splitting the second covering part 132 from the first covering part 131 by applying frictional force or any other mechanical approaches). In this embodiment, the filter pattern formed by the first covering part 131 of the conductive layer 130 achieves filtering on the passing electromagnetic waves.

It is to be noted that, in the above embodiment, viscosity or adhesive force between the adhesive layer 120 and the first covering part 131 of the conductive layer 130 are not limited to be generated by heating. In some embodiments, heating, cooling, and/or exerting pressure, or a combination thereof may be applied to generate the viscosity or the adhesive force according to the material properties of the adhesive layer 120 and the conductive layer 130. In one embodiment, viscosity or adhesive force may be generated between the adhesive layer 120 and the conductive layer 130 by exerting pressure on the first covering part 131 of the conductive layer 130 covering on the adhesive layer 120, and thus heating may be optional. In one embodiment, viscosity or adhesive force may be generated by cooling the adhesive layer 120 and the conductive layer 130. In one preferred embodiment, heating and exerting pressure may be adopted in combination to increase the yield rate of manufactured filters of satisfactory quality.

In an embodiment, step S301 where the adhesive layer 120 is defined on the surface of the substrate 110 according to the filter pattern includes printing the adhesive layer 120 on the surface of the substrate 110 according to the filter pattern. For example, the filter pattern may be printed out with toner on paper by utilizing a printer. Alternatively, in some embodiments, the filter pattern may also be defined on the adhesive layer 120 on the surface of the substrate 110 by coating, dyeing, or ink-jet, and is not limited to using a toner-based printer.

In an embodiment, step S303 where the adhesive layer 120 and the conductive layer 130 are heated includes covering the conductive layer 130 by a film; and heating and exerting pressure on the film, the conductive layer 130, the adhesive layer 120 and the substrate 110 at the same time. Heating and exerting pressure may be performed at the same time with a flat-clamp-type or drum-type laminator and a heating platform, for example, through a general laminator and heating platform available on the market. In one embodiment, the film is a plastic film used in a laminator.

As an example, in the manufacturing method according to the embodiments of the disclosure, a filter can be rapidly manufactured and developed by utilizing a laminator as a heating platform and a home printer. The laminator and the home printer are commonly available on the market at consumer-level prices. By the manufacturing method according to the embodiments of the disclosure, after the dimensions and the filter pattern of the filter are designed according to the application requirements, the filter pattern may be printed (i.e., the adhesive layer 120 may be defined) on a paper (i.e., the substrate 110) through a printer. The upper layer of the printed paper is sequentially covered by a layer of metal foil (i.e., the conductive layer 130) and a laminating plastic film and then the printed paper covered with the film is fed into the laminator. During the heating process of the laminator, the metal foil is heated and thus adhered on the filter pattern defined by toner (i.e., the first covering part 131), and not likely to be adhered to the area (i.e., the second covering part 132) not defined by the toner. Therefore, in the manufacturing method according to the embodiments of the disclosure, the designed filter pattern may be effectively transfer-printed on paper indirectly with a metal material. Then, after the plastic film and the excess metal material not adhered to the paper are removed, the remaining metal material forms the filter pattern which is accordingly a filter available for use, also referred to as a printable filter.

In addition to FIG. 3A and FIG. 3B, in some alternative embodiments, it is worth noting that the filter structure 20 may be formed by the second covering part 132 of the conductive layer 130 instead of the first covering part 131 of the conductive layer 130. That is to say, a complementary filter pattern can be represented by the second covering part 132, since the complementary filter pattern can be determined after the filter pattern is defined by the adhesive layer 120. In those alternative embodiments, the first covering part 131 of the conductive layer 130 are removed together with the adhesive layer 120, and therefore the second covering part 132 of the conductive layer 130 remains and forms the complementary filter pattern to the filter pattern of filter structure 20, resulting in the filter 10' as shown in FIG. 1B.

Figure 4A:
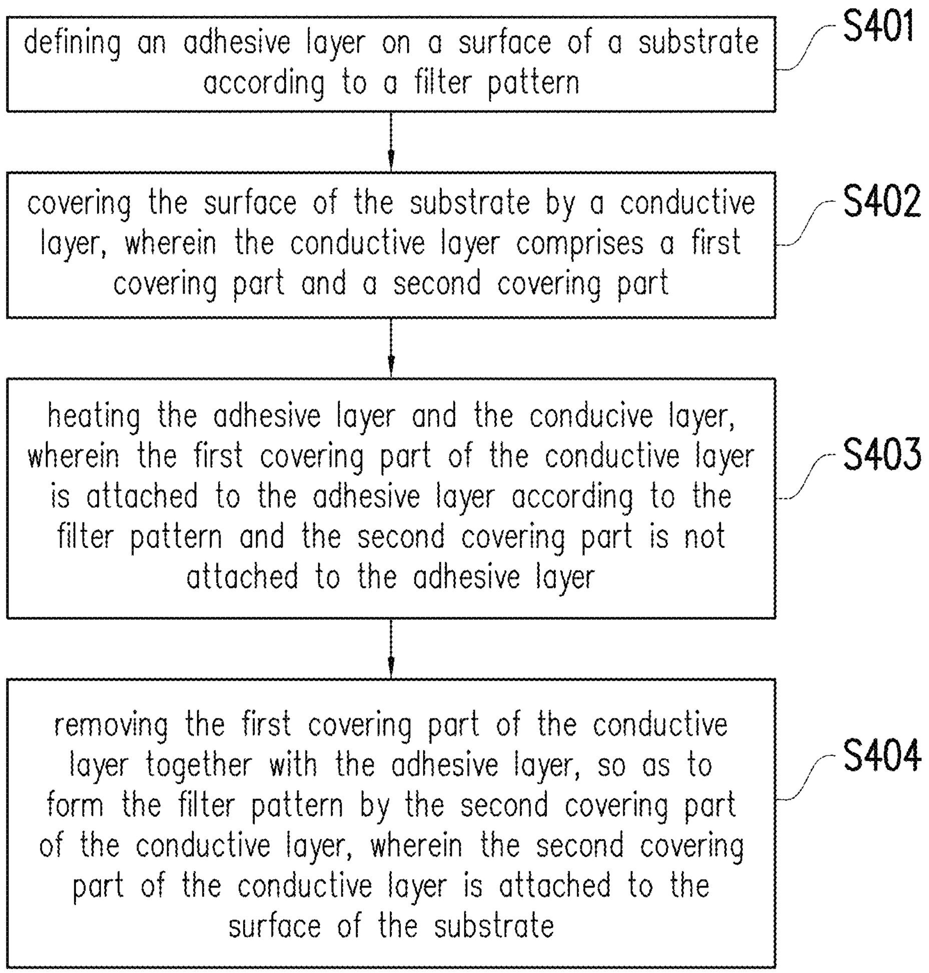
FIG. 4A is a flowchart of a manufacturing method of a filter according to an alternative embodiment of the disclosure.
Figure 4B:
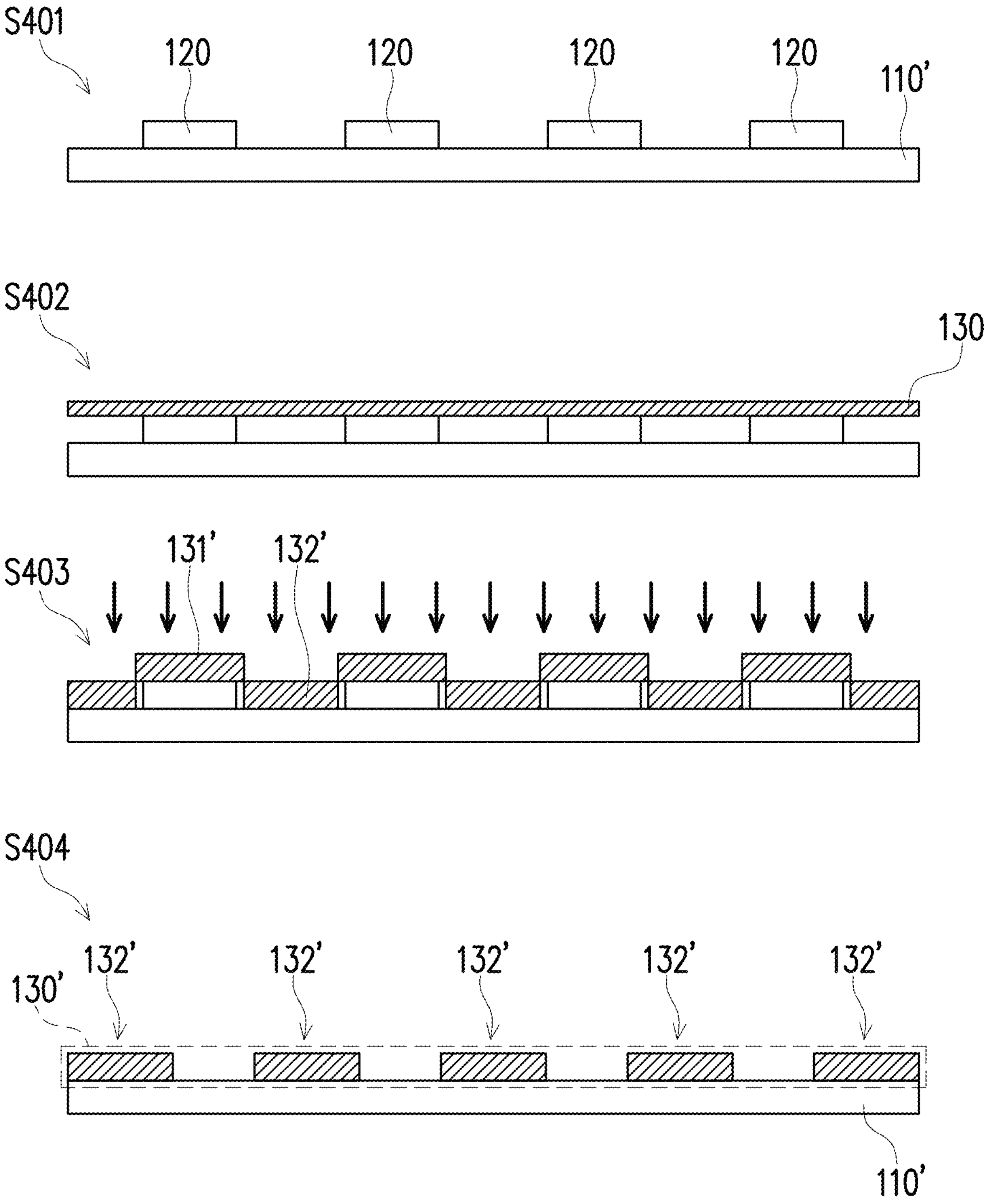
FIG. 4B is a schematic diagram of steps of manufacturing a filter according to an alternative embodiment of the disclosure.

FIG. 4A is a flowchart of a manufacturing method of a filter according to an alternative embodiment of the disclosure. FIG. 4B is a schematic diagram of steps of manufacturing a filter according to an alternative embodiment of the disclosure. Please refer to FIG. 4A and FIG. 4B. An alternative manufacturing method of a filter includes the following steps. In step S401, define an adhesive layer 120 on a surface of a substrate 110' according to a filter pattern. In step S402, cover the surface of the substrate 110' by a conductive layer 130. The conductive layer 130 includes a third covering part 131' and a fourth covering part 132' which correspond to the parts of the filter 10' as shown in FIG. 1B. In step S403, heating the adhesive layer 120 and the conducive layer 130, wherein the third covering part 131' of the conductive layer 130 is attached to the adhesive layer 120 according to the filter pattern and the fourth covering part 132' is not attached to the adhesive layer 120. In step S404, removing the third covering part 131' of the conductive layer 130' together with the adhesive layer 120, so as to form the filter pattern by the fourth covering part 132' of the conductive layer 130', wherein the fourth covering part 132' of the conductive layer 130' is attached to the surface of the substrate 110'.

Concretely, in the alternative manufacturing method, steps S403 and S404 can be considered as modifications of steps S303 and S304 with respect to the step of removing the third covering part 131' of the conductive layer 130' together with the adhesive layer 120. Thus, in the alternative embodiment, instead of the first-third covering part 131' which has been removed in step S404, a complementary filter pattern is formed by the remaining fourth covering part 132' of the conductive layer 130'. The complementary filter pattern formed by the fourth covering part 132' of the conductive layer 130' achieves filtering on the passing electromagnetic waves.

In the alternative manufacturing method, the fourth covering part 132' of the conductive layer 130' is attached to the surface of the substrate 110'. The attachment between the fourth covering part 132' of the conductive layer 130' and the surface of the substrate 110' can be implemented by mechanical or chemical approaches.

Namely, viscosity or adhesive force may be generated between the substrate 110' and the conductive layer 130' because of the material properties of the substrate 110' and the conductive layer 130'. In one embodiment, viscosity or an adhesive force are generated between the substrate 110' and the conductive layer 130' when the substrate 110' and the conductive layer 130' being heated, so that the conductive layer 130' is adhered to the substrate 110' after being heated. However, it is noted that viscosity or adhesive force between the substrate 110' and the conductive layer 130' are not limited to be generated by heating. In some embodiments, heating, cooling, and/or exerting pressure, or a combination thereof may be applied to generate the viscosity or the adhesive force according to the material properties of the substrate 110' and the conductive layer 130'. In one embodiment, viscosity or adhesive force may be generated between the substrate 110' and the conductive layer 130' by exerting pressure on the conductive layer 130' covering on the surface of the substrate 110', and thus heating may be optional. In one preferred embodiment, heating and exerting pressure may be adopted in combination to increase the yield rate of manufactured filters of satisfactory quality.

In one embodiment, alternative heating and cooling approaches can be provided to the conductive layer 130' and the substrate 110' to attach the fourth covering part 132' of the conductive layer 130' and the substrate 110'. In an alternative embodiment, the third covering part 131' of the conductive layer 130' together with the adhesive layer 120 can be removed by chemical or mechanical approaches according to the materials of the third covering part 131' and the adhesive layer 120. In one embodiment, the chemical can be Sulfuric acid (H2SO4) when the material of the substrate 110' can be composed by polymer and the adhesive layer 120 can be formed by toner.

FIG. 5A is a transmission power spectrum in dB vs. Frequency in THz of a filter according to an embodiment of the disclosure. The transmission power spectrum shown in FIG. 5A corresponds to the use of the pattern of the filter pattern 201 shown in FIG. 2A. In this embodiment, the dimensions of the filter pattern 201 is a filter with the first side length C1=0.4 millimeter (mm), the second side length C2=0.2 mm, and the pitch C3=0.05 mm. As shown in FIG. 5A, in this embodiment, this filter effectively filters electromagnetic waves falling within the section of 0.18 THz, and achieves filtering of about 5 decibels (dB).

FIG. 5B is a transmission power spectrum in dB vs. Frequency in THz of a filter according to an embodiment of the disclosure. The transmission power spectrum shown in FIG. 5B corresponds to the use of the pattern of the filter pattern 202 shown in FIG. 2B. In this embodiment, the dimensions of the filter pattern 202 is a filter with the height H1=0.8 mm, the opening width H2=0.2 mm, and the central height H3=0.4 mm. As shown in FIG. 5B, in this embodiment, this filter effectively filters electromagnetic waves falling within the section of 0.4 THz to 1.0 THz, and achieves filtering of about 6 decibels (dB).

Figure 6A:
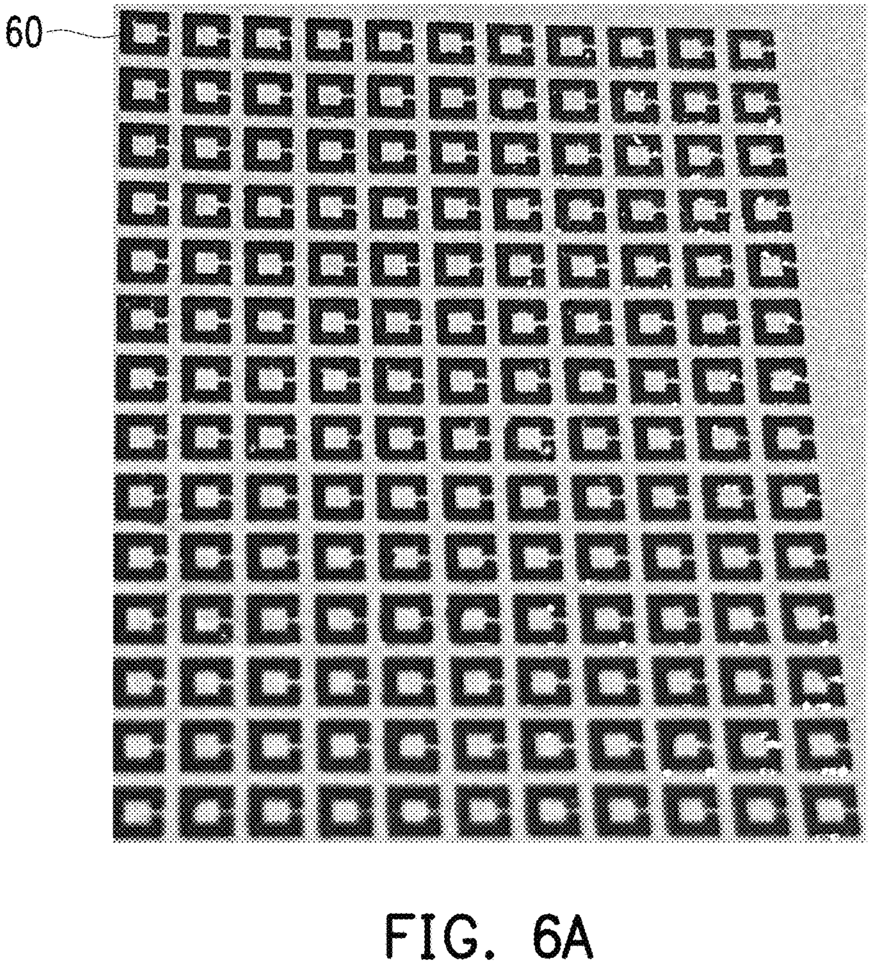
FIG. 6A shows an example of manufacturing a plurality of filters in a C-shaped pattern according to an embodiment of the disclosure.
Figure 6B:
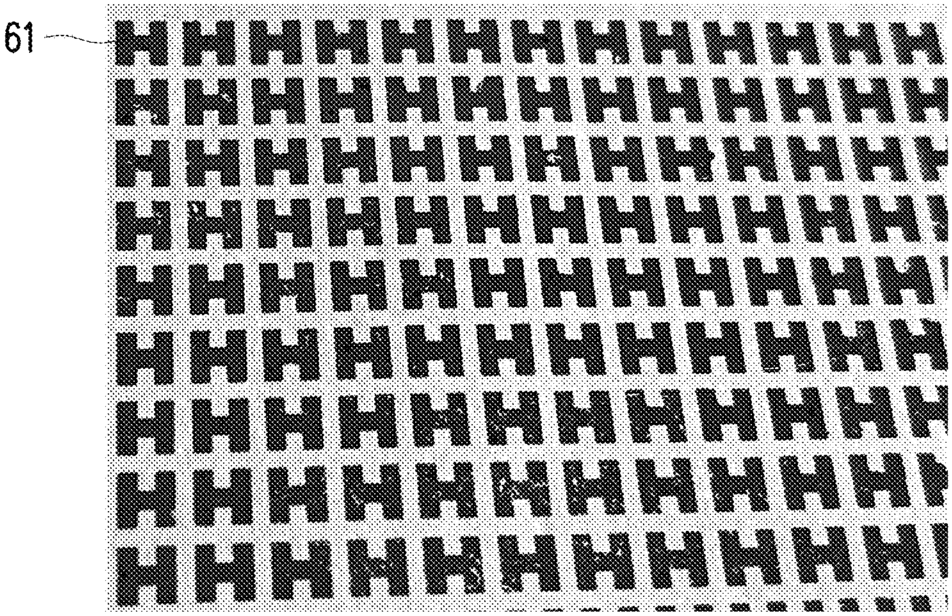
FIG. 6B shows an example of manufacturing a plurality of filters in an H-shaped pattern according to an embodiment of the disclosure.

FIG. 6A shows an example of manufacturing a plurality of filters in a C-shaped pattern according to an embodiment of the disclosure. As shown in FIG. 6A, the plurality of filter patterns may be printed on a sheet of paper at the same time. For example, a filter 60 shown in FIG. 6A corresponds to the filter pattern 201 presenting a C-shaped pattern shown in FIG. 2A. Moreover, a plurality of filter patterns 201 of the same dimensions are printed on the paper of FIG. 6A at the same time taking the filter 60 as a unit. FIG. 6B shows an example of manufacturing a plurality of filters in an H-shaped pattern according to an embodiment of the disclosure. As shown in FIG. 6B, the plurality of filter patterns in a pattern different from that in FIG. 6A may be printed on a sheet of paper at the same time. For example, a filter 61 shown in FIG. 6B corresponds to the filter pattern 202 presenting an H-shaped pattern shown in FIG. 2B. Moreover, a plurality of filter patterns 202 of the same dimensions are printed on the paper of FIG. 6B at the same time taking the filter 61 as a unit.

The manufacturing method according to the embodiments of the disclosure is not limited to printing only the filter pattern 201 of the same shape or dimensions. In the manufacturing method according to the embodiments of the disclosure, the filter pattern 201 of different dimensions or filter patterns of different shapes, for example, the filter patterns 202, 203, 204 of FIG. 2B, FIG. 2C, or FIG. 2D, respectively or a combination thereof, may also be printed at the same time. In some embodiments, the filter pattern 201 of different dimensions or filter patterns of different shapes are not limited to the filter patterns as shown in FIG. 2A, FIG. 2B, FIG. 2C, or FIG. 2D.

Figure 7A:
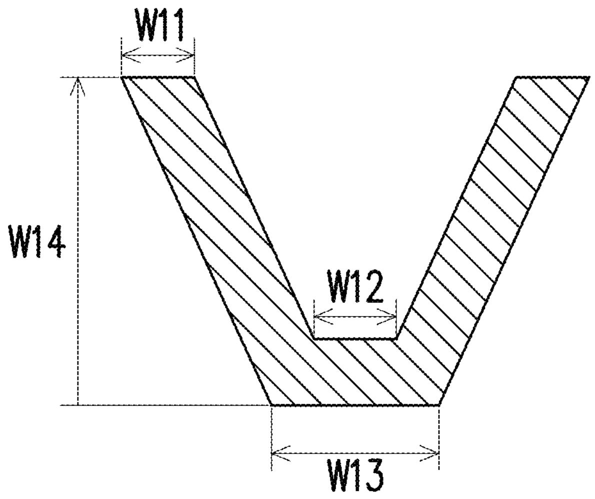
FIG. 7A is a schematic diagram of a filter pattern presenting a V-shaped pattern according to an embodiment of the disclosure.
Figure 7B:
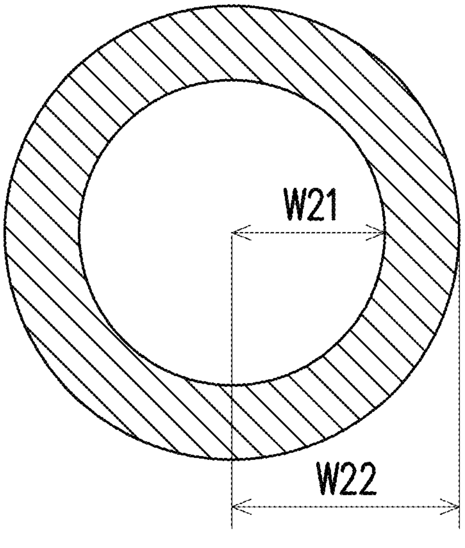
FIG. 7B is a schematic diagram of a filter pattern presenting an O-shaped pattern according to an embodiment of the disclosure.
Figure 7C:
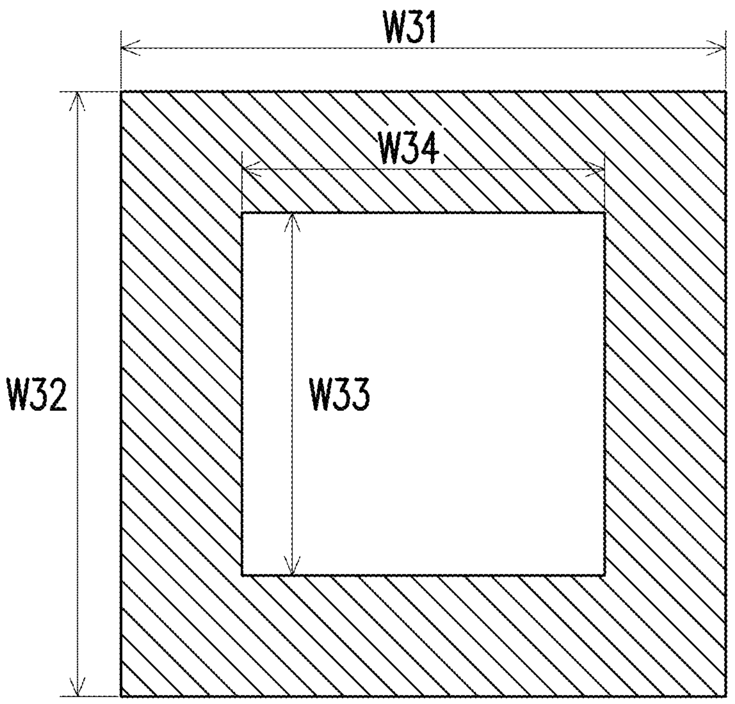
FIG. 7C is a schematic diagram of a filter pattern presenting a rectangle pattern according to an embodiment of the disclosure.
Figure 7D:
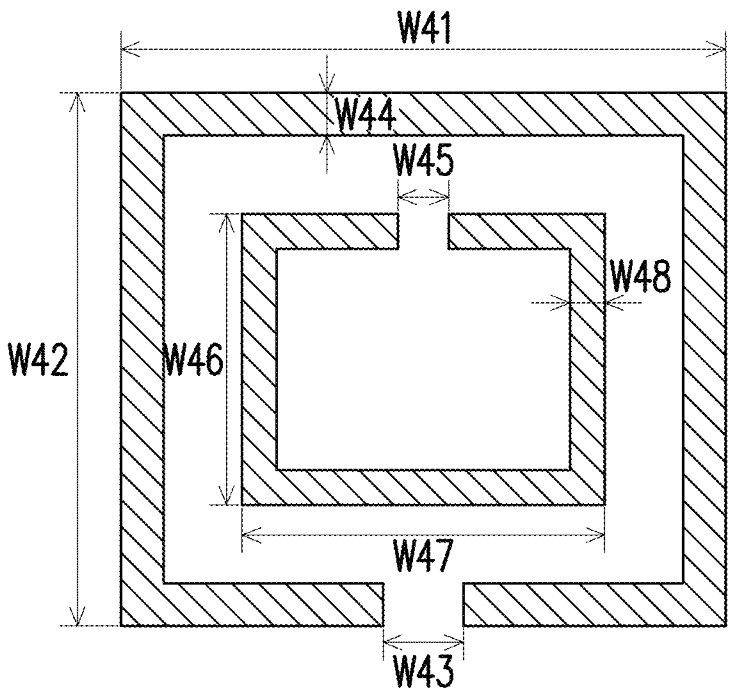
FIG. 7D is a schematic diagram of a filter pattern presenting a complementary rectangle pattern according to an embodiment of the disclosure.
Figure 7E:
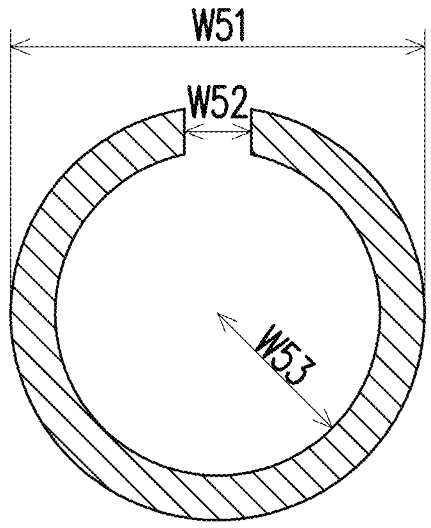
FIG. 7E is a schematic diagram of a filter pattern presenting a split ring pattern according to an embodiment of the disclosure.
Figure 7F:
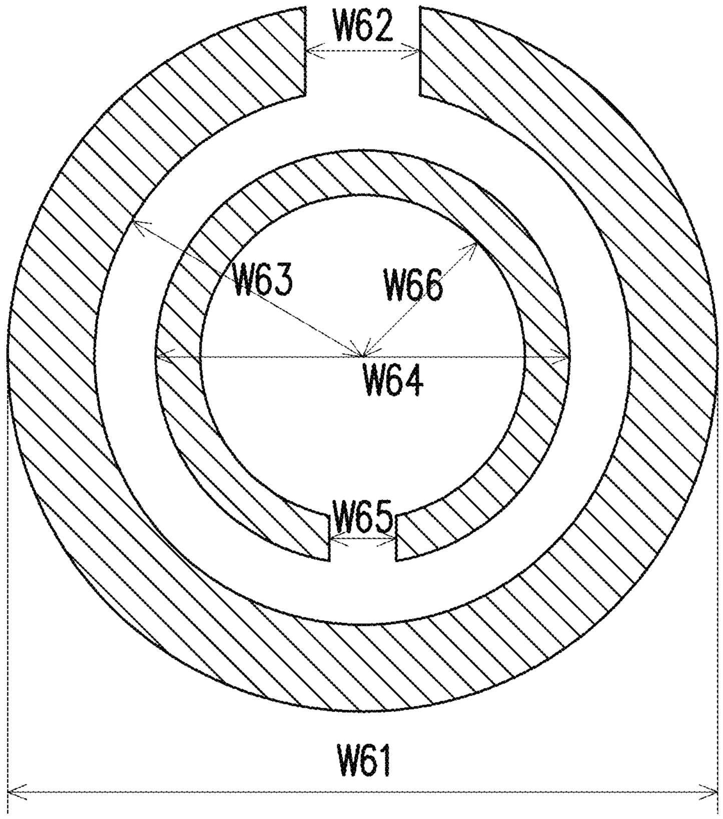
FIG. 7F is a schematic diagram of a filter pattern presenting a complementary split ring pattern according to an embodiment of the disclosure.

FIG. 7A is a schematic diagram of a filter pattern presenting a V-shaped pattern according to an embodiment of the disclosure, which includes a length W11, a length W12, a length W13, and a height W14. FIG. 7B is a schematic diagram of a filter pattern presenting an O-shaped pattern according to an embodiment of the disclosure, which includes a radius W21, and a radius W22. FIG. 7C is a schematic diagram of a filter pattern presenting a rectangle pattern according to an embodiment of the disclosure, which includes a length W31, a length W32, a length W33, and a length W34. FIG. 7D is a schematic diagram of a filter pattern presenting a complementary rectangle pattern according to an embodiment of the disclosure, which includes a length W41, a length W42, a gap W43, a width W44, a gap W45, a length W46, a length W47, and a width W48. FIG. 7E is a schematic diagram of a filter pattern presenting a split ring pattern according to an embodiment of the disclosure, which includes a diameter W51, a gap W52, and a radius W53. FIG. 7F is a schematic diagram of a filter pattern presenting a complementary split ring pattern according to an embodiment of the disclosure, which includes a diameter W61, a gap W62, a radius W63, a diameter W64, a gap W65, and a radius W66.

In one embodiment, the pattern of the filter pattern 201 may be designed according to a target frequency band or a plurality of designed frequency bands. In one embodiment, the filter pattern 201 may be a C-shaped pattern, an H-shaped pattern, a cross-shaped pattern, a double L-shaped pattern, a V-shaped pattern, an O-shaped pattern, a rectangle pattern, a complementary rectangle pattern, a split ring pattern, a complementary split ring pattern, or a combination of the patterns above.

In some embodiments, the shape or dimensions of the filter pattern corresponding to the target frequency band may be determined according to different usage requirements, so that filters of different specifications available for use can be rapidly manufactured in a large quantity.

In summary of the foregoing, the filter and the manufacturing method thereof according to the embodiments of the disclosure achieve rapid mass production, low equipment cost, and low production cost. The manufacturing method according to the embodiments of the disclosure is applicable to printing devices which are commonly affordable at consumer-level prices, for example, a home printer which may cost at a comparable price to that of common household appliances, and therefore the overall cost of the equipment and environment setup can be greatly reduced in comparison with the conventional manufacturing methods of a terahertz filter, sub-terahertz filter, or mm Wave filter. In one embodiment, the manufacturing cost of the filter is only one thousandth or less of the cost of conventional filter manufacturing processes. Moreover, the filter and the manufacturing method thereof according to the embodiments of the disclosure achieve rapid development and manufacturing of a terahertz filter, sub-terahertz filter, or mmWave filter. In this way, the development of industrial applications in the terahertz filter, sub-terahertz filter or mmWave filter can be improved by rapid prototyping and low-cost mass production.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A filter, comprising:

a substrate; and a filter structure, wherein the filter structure forms a filter pattern on a surface of the substrate, and the filter structure comprises:

an adhesive layer coupled to the substrate; and a conductive layer, coupled to the adhesive layer, comprising a first covering part, wherein the first covering part of the conductive layer is attached to the adhesive layer, wherein the adhesive layer is attached to the surface of the substrate according to the filter pattern, and the first covering part of the conductive layer is attached to the adhesive layer to form the filter pattern.

2. The filter according to claim 1, wherein the filter pattern corresponds to a target frequency band or a plurality of designed frequency bands, wherein a dimension of the filter pattern is determined by the target frequency band or the plurality of designed frequency bands.

3. The filter according to claim 2, wherein the target frequency band or the plurality of designed frequency bands comprising at least one of a terahertz frequency band, a sub-terahertz frequency band, or a mmWave frequency band.

4. The filter according to claim 1, wherein a material of the substrate comprises at least one of paper, plastic, polymer, bio-compatible material, glass, or a semiconductor substrate.

5. The filter according to claim 1, wherein a material of the adhesive layer comprises at least one of toner, ink, pigment, a hot-melt adhesive, or an organic heating-type adhesive.

6. The filter according to claim 1, wherein a material of the conductive layer comprises at least one of metal foil, gold foil, gold, silver, copper, or a highly conductive polymer.

7. The filter according to claim 1, wherein the filter pattern comprises at least one of a C-shaped pattern, an H-shaped pattern, a cross-shaped pattern, a double L-shaped pattern, a V-shaped pattern, an O-shaped pattern, a rectangle pattern, a complementary rectangle pattern, a split ring pattern, a complementary split ring pattern, or a combination thereof.

8. The filter according to claim 1, wherein the first covering part of the conductive layer is attached to the adhesive layer after the adhesive layer and the conductive layer are heated.

9. A manufacturing method of a filter, comprising:
- defining an adhesive layer on a surface of a substrate according to a filter pattern;
- covering the surface of the substrate by a conductive layer,
- wherein the conductive layer comprises a first covering part and a second covering part,
- wherein the first covering part and the second covering part are non-overlapping,
- wherein the first covering part of the conductive layer is attached to the adhesive layer according to the filter pattern and the second covering part is not attached to the adhesive layer,
- wherein defining the adhesive layer on the surface of the substrate according to the filter pattern comprises:
- printing the adhesive layer on the surface of the substrate according to the filter pattern.

10. The manufacturing method according to claim 9, wherein the filter pattern corresponds to a target frequency band or a plurality of designed frequency bands, wherein a dimension of the filter pattern is determined by the target frequency band or the plurality of designed frequency bands, wherein the target frequency band or the plurality of designed frequency bands comprising at least one of a terahertz frequency band, a sub-terahertz frequency band, or a mmWave frequency band.

11. The manufacturing method according to claim 9, wherein the filter pattern comprises at least one of a C-shaped pattern, an H-shaped pattern, a cross-shaped pattern, or a double L-shaped pattern, a V-shaped pattern, an O-shaped pattern, a rectangle pattern, a complementary rectangle pattern, a split ring pattern, a complementary split ring pattern, or a combination thereof.

12. The manufacturing method according to claim 9, wherein a material of the conductive layer comprises at least one of metal foil, gold foil, gold, silver, copper, or a highly conductive polymer.

13. The manufacturing method according to claim 9, wherein a material of the adhesive layer comprises at least one of toner, ink, pigment, a hot-melt adhesive, or an organic heating-type adhesive.

14. The manufacturing method according to claim 9, further comprising:
- removing the second covering part of the conductive layer.

15. The manufacturing method according to claim 9, further comprising:
- removing the first covering part of the conductive layer together with the adhesive layer, so as to form the filter pattern by the second covering part of the conductive layer, wherein the second covering part of the conductive layer is attached to the surface of the substrate.

16. The manufacturing method according to claim 9, wherein a material of the substrate comprises at least one of paper, plastic, polymer, bio-compatible material, glass, or a semiconductor substrate.

* * * * *